(12) United States Patent
Bunker

(10) Patent No.: US 6,945,370 B1
(45) Date of Patent: Sep. 20, 2005

(54) HUB SUPPORT

(75) Inventor: Kenneth James Bunker, Leicester (GB)

(73) Assignee: Delphi Technologies, Inc., Troy, MI (US)

( * ) Notice: Subject to any disclaimer, the term of this patent is extended or adjusted under 35 U.S.C. 154(b) by 15 days.

(21) Appl. No.: 09/869,726

(22) PCT Filed: Jan. 7, 2000

(86) PCT No.: PCT/GB00/00035

§ 371 (c)(1),
(2), (4) Date: Aug. 27, 2001

(87) PCT Pub. No.: WO00/42332

PCT Pub. Date: Jul. 20, 2000

(30) Foreign Application Priority Data

Jan. 13, 1999 (GB) .............................................. 9900668

(51) Int. Cl.[7] .............................................. F16D 55/00
(52) U.S. Cl. .................... 188/71.1; 188/73.1; 188/71.3; 188/71.5
(58) Field of Search ............................. 188/18 A, 71.1, 188/73.1, 71.3, 71.5, 72.4

(56) References Cited

U.S. PATENT DOCUMENTS

| 2,943,827 | A | * | 7/1960 | Hartel et al. | ............... | 188/18 A |
| 3,788,429 | A | * | 1/1974 | Brook et al. | ............... | 188/18 A |
| 3,940,159 | A | * | 2/1976 | Pringle | ...................... | 188/18 A |
| 3,941,221 | A | * | 3/1976 | Pringle | ...................... | 188/18 A |
| 4,844,206 | A | * | 7/1989 | Casey | ....................... | 188/18 A |
| 6,298,953 | B1 | * | 10/2001 | Bunker | ...................... | 188/71.1 |
| 6,371,250 | B1 | * | 4/2002 | Bunker | ...................... | 188/71.5 |

FOREIGN PATENT DOCUMENTS

| EP | 473 876 A1 | 3/1992 | |
| FR | 2 755 195 A1 | 10/1996 | |
| GB | 662071 | 11/1951 | |
| GB | 2320301 | 6/1998 | |
| WO | WO 94/25771 | 11/1994 | |
| WO | WO 98/26191 | 6/1998 | |
| WO | WO 9826191 A1 | * 6/1998 | ........... F16D/55/00 |
| WO | WO 99/13239 | 3/1999 | |

OTHER PUBLICATIONS

M. Jean–Claude Girauldon, Evolution Technologigue, IV. Equipements De Chasssis, 1141 Ingenieurs de l'Automobile, (1982) No. 7, Paris France.

* cited by examiner

Primary Examiner—Robert A. Siconolfi
(74) Attorney, Agent, or Firm—Michael D. Smith

(57) ABSTRACT

A hub support (12) by which a wheel-supporting hub (14) may be supported for rotation relative to an axis (22). The hub support (12) comprises a one-piece metal casting, the casting comprising mounting means (12b, 12c) by which the hub support (12) may be mounted on a vehicle, and support means for a hub (12a). The support (12) also forms part of or a mounting for operating means (26, 32) by which friction material pads (18) of a disc brake (15) are brought into force-applying engagement with one or more discs (16) mounted on the hub (14). Said one-piece metal casting also comprises a guide (28; 28a; 28b) on which at least one of said friction material pads (18) may be mounted for movement relative to the axis (22).

11 Claims, 4 Drawing Sheets

HUB SUPPORT

This invention is concerned with a hub support for a vehicle and with a hub supporting and braking assembly for a vehicle.

Conventional vehicles have hub supports, known, for example, as "stub axles" and "steering knuckles", which support a wheel-supporting hub for rotation about an axis. Such a hub support may be associated with a carrying wheel or a steered wheel. An example of such a hub support which incorporates a suspension link is disclosed in WO 98/25804. Many such hub supports have disc brakes associated therewith to brake a wheel supported on the hub. Conventionally, a disc is fixed to the hub and is braked by friction material pads which engage opposite surfaces of the disc. Such a disc brake also comprises operating means, normally a piston and cylinder assembly, operable to bring the pads into force-applying engagement with the disc. The operating means is normally a piston and cylinder assembly having its cylinder formed as part of a sliding caliper mounted on the hub support. In the case of the hub support disclosed in the aforementioned WO 98/25804, the disc brake comprises two discs which are mounted on the hub, side by side, for axial movement on the hub but which are fixed against rotation relative to the hub. The operating means disclosed in WO 98/25804 is operable to bring friction pads into engagement with both sides of both discs. The operating means of WO 98/25804 comprises a hydraulic piston and cylinder assembly having its cylinder cast integrally with the hub support. The hub support of WO 98/25804 also comprises a guide for the movable friction material pads. The guide provides a slideway on which backing plates for the friction material pads can slide axially of the hub. The guide has an intricate shape and is formed as a separate piece which is bolted to the hub support. WO 98/26191 proposes that the guide should be mounted on the hub support by means of bolts which extend through bores extending throughout the guide to increase the strength thereof, since the relatively-thin guide has to absorb high bending and shearing forces. However, the provision of a separate guide complicates assembly and adds to cost.

It is an object of the present invention to provide a hub support which reduces the amount of assembly required.

The invention provides a hub support for a vehicle by which a wheel-supporting hub may be supported for rotation relative to an axis, the hub support comprising a one-piece metal casting, the casting comprising mounting means by which the hub support may be mounted on a vehicle, support means for a hub, and at least one feature which forms part of or provides a mounting for operating means operable to bring friction material pads of a disc brake into force-applying engagement with one or more discs of the disc brake which are mounted on said hub, characterised in that said one-piece metal casting also comprises a guide on which at least one of said friction material pads may be mounted for movement relative to the axis.

In a hub support according to the invention, the guide is cast integrally with the hub support, eg in gray cast iron, so that it does not require to be separately assembled. Surprisingly, it is found that sufficient accuracy can be achieved in the casting process to enable an integrally cast guide to be used with little or no extra machining.

A hub support according to the invention may be in the form of a steering knuckle, in which case the one-piece metal casting may also include a steering arm for connection to a track rod of a steering system of the vehicle The mounting means of the hub support may comprise mountings by which the hub support can be mounted on shock absorbers and/or tie bars etc. of a vehicle.

In a hub support according to the invention, the feature which forms part of or provides a mounting for the operating means may be the cylinder of a piston and cylinder assembly as disclosed in WO 98/25804, or may, for example, be a recess in which a force applicator is mounted.

The invention also provides a hub supporting and braking assembly for a vehicle, the assembly comprising a hub support, a wheel-supporting hub supported on said hub support for rotation relative to an axis, and a disc brake operable to brake the rotation of said hub, the disc brake comprising at least one disc which is mounted on the hub for axial movement thereon but which is fixed against rotation relative to the hub, and friction material pads arranged to engage each side of each disc to brake the rotation of said hub, the disc brake also comprising supporting means for said friction material pads by which one of said pads is supported so that it is fixed relative to said hub and at least one other of said pads is supported for axial movement relative to the hub, the disc brake also comprising operating means operable to move said movable pad and said disc to brake said hub, said hub support comprises a one-piece metal casting, the casting comprising mounting means by which the hub support may be mounted on a vehicle, support means for said hub, and a feature which forms part of or provides a mounting for the operating means, characterised in that said one-piece metal casting also comprises a guide on which said movable friction material pad is mounted.

There now follows a detailed description, to be read with reference to the accompanying drawings, of a hub support which is illustrative of the invention, the hub support forming part of an illustrative hub supporting and braking assembly.

In the drawings

Figure 1:
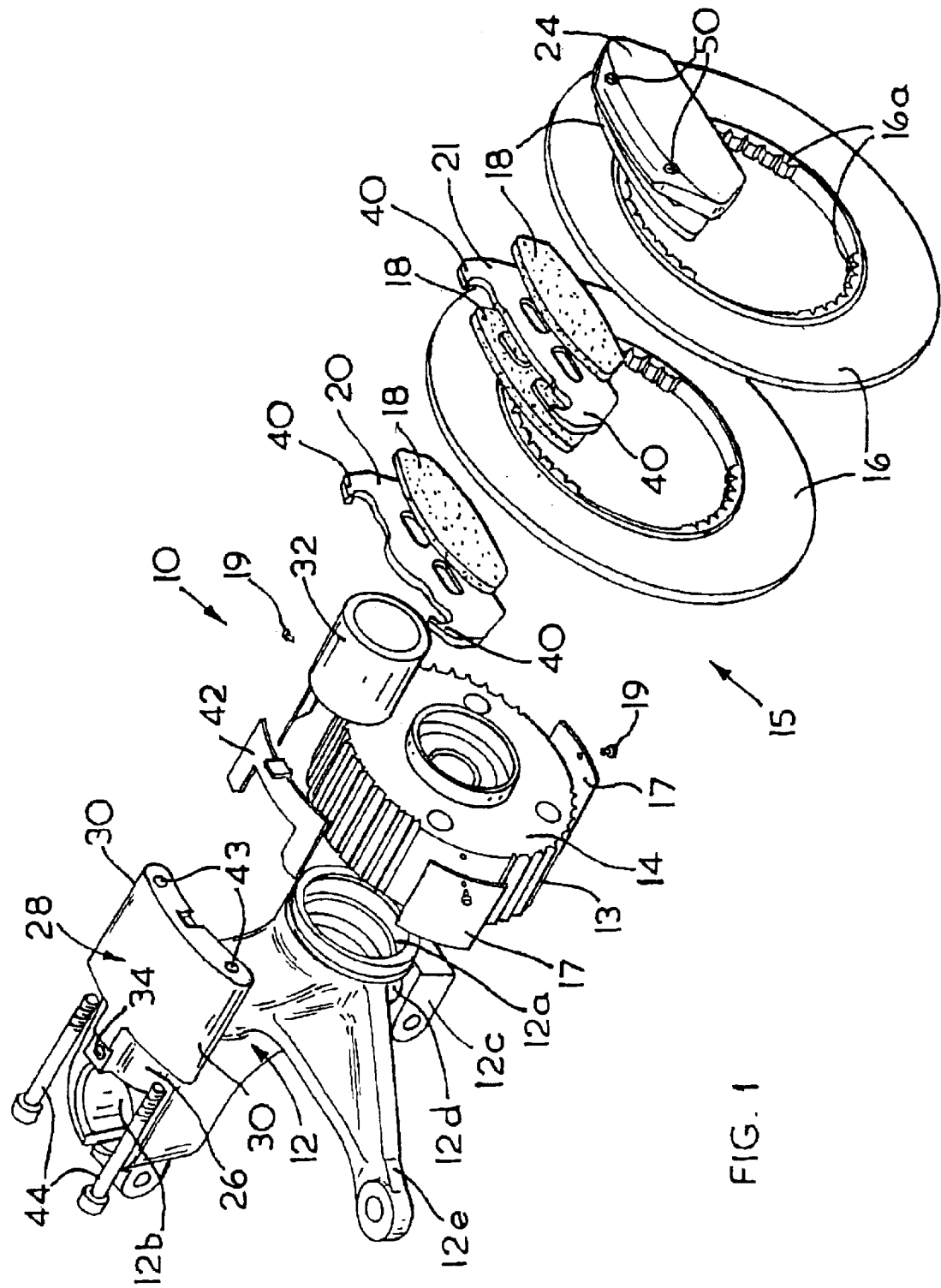
FIG. 1 is a an exploded view of the illustrative hub support and braking assembly.

The illustrative hub support and braking assembly 10 comprises a hub support 12, and a wheel-supporting hub 14 supported on the hub support 12 for rotation relative to an axis 22 passing through the centre of the hub 14. The hub 14 is driven by a constant velocity joint 11 which is received in the hub in a conventional manner. The assembly 10 also comprises a disc brake 15 operable to brake the rotation of the hub 14.

The hub support 12 is for use in conjunction with a front wheel of a front wheel-drive car. The hub support 12 comprises a hollow cylindrical portion 12*a* of conventional form which provides support means for the hub 14. Specifically, the portion 12*a* houses bearings on which the hub 14 rotates. The hub support 12 also comprises mounting means by which the support 12 may be mounted on a vehicle. The mounting means comprises a top mounting 12*b* and a bottom mounting 12*c*. The top mounting 12*b* forms two sides of a clamp which can be clamped around a McPherson strut so that the support 12 can pivot about the longitudinal axis of the strut. The bottom mounting 12*c* provides a vertical bore 12*d* in which a pin of a ball joint can be received to connect the support 12 to a tie bar in conventional manner.

The support 12 also comprises a steering arm 12*e* for connection to a track rod of the steering system of the vehicle.

Thus, the support 12 is a one-piece casting including the bearing housing 12a, the top mounting 12b, the bottom mounting 12c, and the arm 12e. As will appear from the description below, the support 12 also includes other features.

The disc brake 15 comprises two discs 16 which are mounted on the hub 14 for axial sliding movement in the direction of the axis 22. The discs 16 are, however, fixed against rotation relative to the hub 14. Specifically, the hub 14 has a generally cylindrical outer surface on which are formed three groups of axially extending splines 13. The discs 16 are formed with teeth 16a which mesh with the splines 13 so that the discs 16 can slide axially along the splines 13 but cannot rotate relative to the hub 14. In modifications of the illustrative assembly 10, the splines 13 and the teeth 16a may be replaced by other arrangements which allow axial sliding movement but prevent relative rotation.

The hub 14 has three leaf springs 17 secured thereto by screws 19. The leaf springs 17 are arranged on portions of the outer surface of the hub 14 which are between the groups of splines 13. Each leaf spring 17 is in the form of a planar sheet of spring steel which is bent to an arcuate shape when the discs 16 are assembled on the hub 14. Each spring 17 resiliently presses on the discs 16. The springs 17 are used to control the movement of the discs 16 on the hub 14, preventing rattling and accommodating thermal expansion.

The disc brake 15 also comprises friction material pads 18 arranged on opposite sides of each of the discs 16. Specifically, one of the friction pads 18 is mounted on a backing plate 20 on one side of the first of the discs 16, two of the pads 18 are mounted on opposite sides of a backing plate 21 which is between the first and the second discs 16, and one of the pads 18 is mounted on an abutment 24 on an opposite side of the second disc to the backing plate 21.

The brake 15 also comprises operating means in the form of a piston and cylinder assembly comprising a cylinder 26 and a piston 32. The cylinder 26 is formed as part of a one-piece casting with the hub support 10. The cylinder 26 extends parallel to the axis 22 and has an open end facing towards the discs 16. The piston 32 is received in the cylinder 26 but can be moved outwardly thereof by the introduction of hydraulic fluid under pressure through a port 34. The assembly 26, 32 is effective to move the pad 18 on the backing plate 20 to thereby cause relative movement between the discs 16 and the pads 18 to bring all the pads 18 into engagement with the discs 16, thereby applying a braking force to the discs 18. Specifically, movement of the pad 18 on the backing plate 20 brings the pad into contact with the first disc 16, the first disc 16 slides axially on the hub 14 into contact with one of the pads 18 on the backing plate 21, continued movement brings the other pad 18 on the backing plate 21 into contact with the second disc 16 which, in turn, slides on the hub until the second disc 16 contacts the pad 18 on the abutment 24.

The disc brake 15 also comprises a guide 28 which is formed as one piece with the hub support 12. The guide 28 projects, parallel to the axis 22, past the edges of both discs 16. The guide 28 supports the abutment 24 which is bolted to the end of the guide 28. The guide 28 also supports the backing plates 20 and 21 and the pads 18 mounted thereon. Specifically, the guide 28 has two side surfaces 30 which are arcuate in transverse cross-section, ie the surfaces 30 are part-cylindrical. The surfaces 30 define a slideway on which the plates 20 and 21 slide, the plates having hook portions 40 which hook over the surfaces 30. A leaf spring 42 is provided between the underside of the guide 28 and the plates 20 and 21 to control the movement of the pads 18 and to prevent rattling.

The guide 28 has two bores 43 extending through it in a direction which is parallel to the axis 22. These bores 43 receive bolts 44 which pass right through the guide 28 and are received in threaded bores 50 in the abutment 24. The bolts 44 serve to strengthen the guide 28 and also to secure the abutment 24 to the guide 28. The bolts 44 assist in resisting the high bending and shearing forces applied during braking. In modifications of the illustrative assembly 10, short bolts passing through the abutment 24 and threadedly received in bores in the guide 28 may be used instead of the bolts 44.

Figure 2:
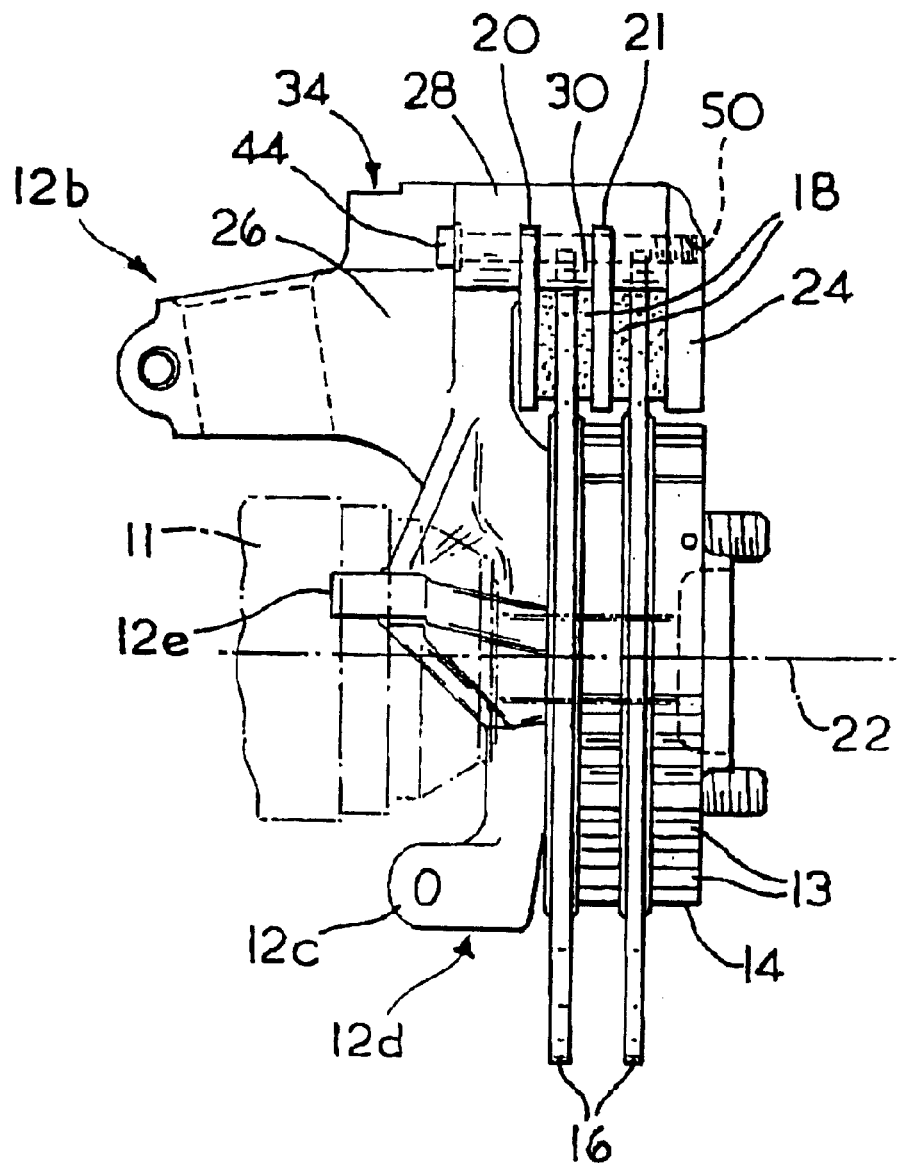
FIG. 2 is a side elevational view of the illustrative assembly.
Figure 3:
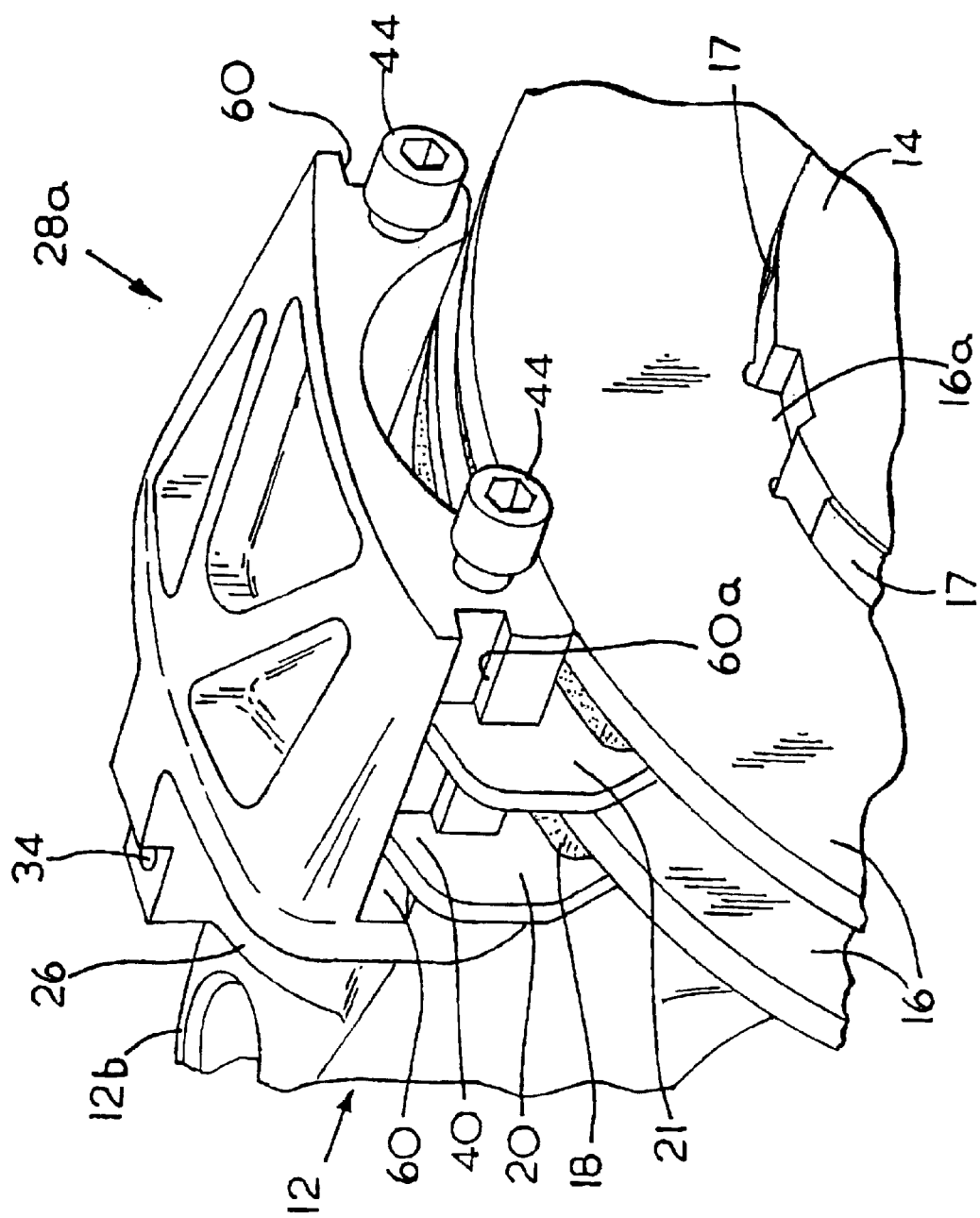
FIGS. 3 and 4 are perspective views of two alternative forms of guide for use in the illustrative assembly.

FIG. 3 shows an alternative form of the guide 28a which differs in detail from the guide 28 shown in FIGS. 1 and 2 but has the same function and is also formed as a one-piece casting with the hub support 12. In the guide 28a, the side surfaces 30 of the guide 28 are replaced by slots 60 extending along the guide 28a on opposite sides thereof. The slots 60 are generally rectangular in transverse cross-section and upwardly-facing surfaces 60a of the slots 60 provide the slideway for the plates 20 and 21. Specifically, the hook portions 40 of the plates 20 and 21 enter the slots 60 and rest on the surfaces 60a against which the plates 20 and 21 are pressed by the action of the spring 42. In FIG. 3, the abutment 24 has been omitted for clarity, the bolts 44 are shown reversed in direction, and the teeth 16a of the discs 16 are replaced by larger single teeth. The guide 28a also recesses in its upper surface.

Figure 4:
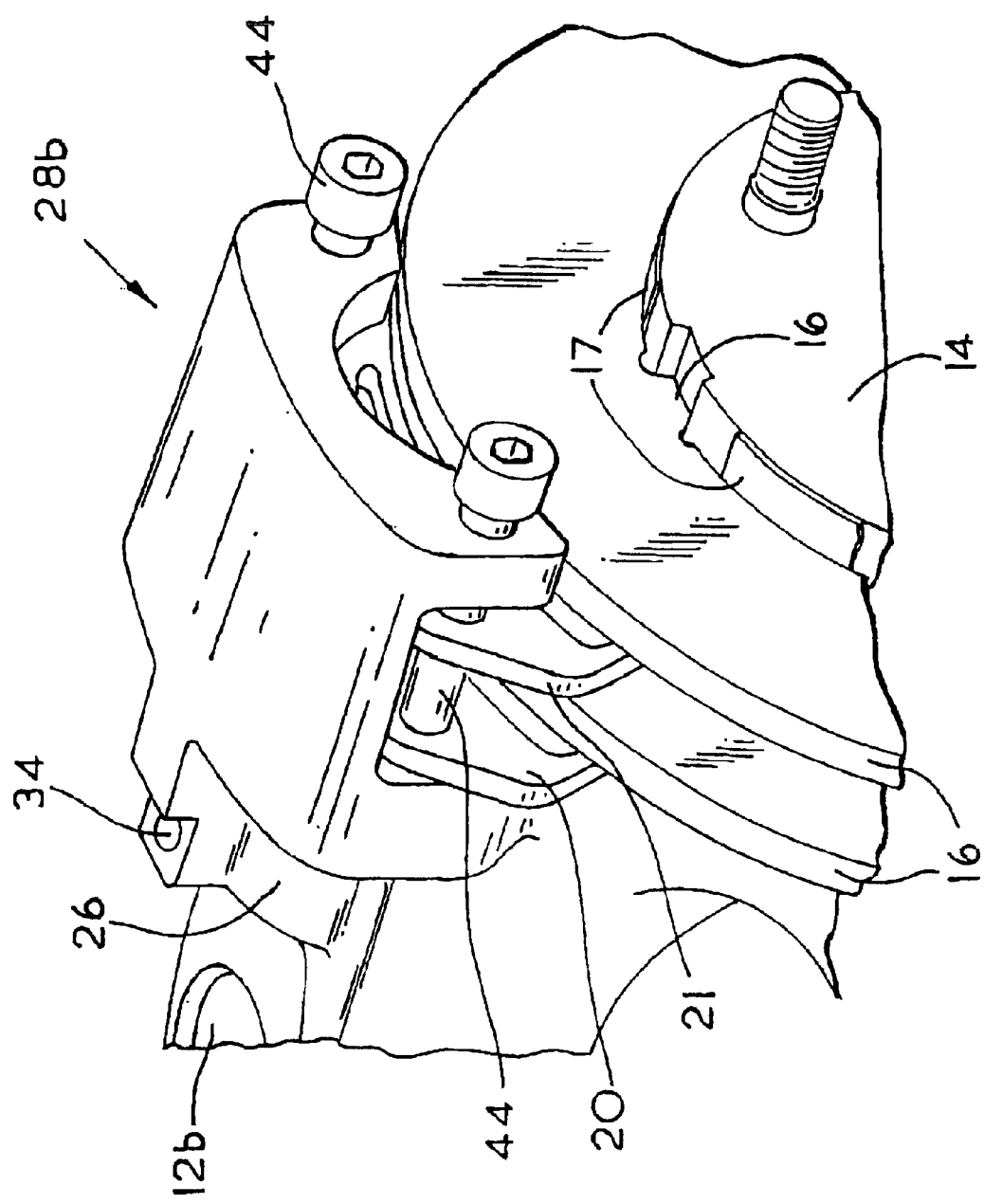

The second alternative guide 28b shown in FIG. 4 differs from the guides 28 and 28a in that the slideway for the plates 20 and 21 is provided by the cylindrical surface of the bolts 44. The casting portion forming the guide 28b, as one piece with the support 12, is recessed to enable the plates 20 and 21 to slide on the bolts 44 which pass through holes in the plates. It would, however, be possible for the plates 20 and 21 to have hook portions sliding on the bolts 44.

What is claimed is:

1. A hub support (12) for a vehicle by which a wheel-supporting hub (14) may be supported for rotation relative to an axis (22), the hub support (12) comprising a one-piece metal casting, the casting comprising mounting means (12b, 12c) by which the hub support may be mounted on a vehicle, support means (12a) for a hub, and at least one feature (26) which forms part of or provides a mounting for operating means (26, 32) operable to bring friction material pads (18) of a disc brake (15) into force-applying engagement with one or more discs (16) of the disc brake which are mounted on said hub (14), characterised in that said one-piece metal casting also comprises a guide (28; 28a; 28b) on which at least one of said friction material pads (18) may be mounted for movement relative to the axis (22).

2. A hub support according to claim 1, characterised in that the one-piece casting also includes a steering arm (12e) for connection to a track rod of a steering system of the vehicle.

3. A hub support according to either one of claims 1 and 2, characterised in that the operating means (26, 32) comprises a cylinder (26) which is cast as one-piece with the support (12).

4. A hub support according to any one of claims 1 to 3, characterised in that reinforcing bolts (44) pass through said guide (28; 28a; 28b).

5. A hub support according to claim 4, characterised in that said bolts (44) provide a slideway for said movable friction material pad (18).

6. A hub supporting and braking assembly (10) for a vehicle, the assembly comprising a hub support (12), a wheel-supporting hub (14) supported on said hub support (12) for rotation relative to an axis (22), and a disc brake (15) operable to brake the rotation of said hub (14), the disc brake (15) comprising at least one disc (16) which is mounted on the hub (14) for axial movement thereon but which is fixed against rotation relative to the hub, and friction material pads (18) arranged to engage each side of each disc (16) to brake the rotation of said hub, the disc brake (15) also comprising supporting means (28) for said friction material pads (18) by which one of said pads is supported so that it is fixed relative to said hub and at least one other of said pads is supported for axial movement relative to the hub (14), the disc brake (15) also comprising operating means (26, 32) operable to move said movable pad and said disc to brake said hub, said hub support (12) comprises a one-piece metal casting, the casting comprising mounting means (12b, 12c) by which the hub support (12) may be mounted on a vehicle, support means (12a) for said hub, and a feature (26) which forms part of or provides a mounting for the operating means (26, 32), characterised in that said one-piece metal casting also comprises a guide (28; 28a; 28b) on which said movable friction material pad is mounted.

7. An assembly according to claim 6, characterised in that the hub support (12) includes a steering arm (120) for connection to a track rod of a steering system of the vehicle.

8. An assembly according to claim 6 characterised in that the operating means (26, 32) comprises a cylinder (26) which is cast as one-piece with the support (12).

9. An assembly according to claim 6 characterised in that reinforcing bolts (44) pass through said guide (28; 28a; 28b).

10. An assembly according to claim 6 characterised in that said bolts (44) provide a slideway for said movable friction material pad (18).

11. A hub supporting and braking assembly, comprising:

a rotatable hub;

at least one brake disc supported by said hub for rotation therewith and for axial sliding movement along said hub;

at least one pair of friction material pads disposed on axially opposite sides of said at least one brake disc;

an actuator device operative to slidingly displace at least one of said friction material pads and said at least one disc along said hub into frictional braking engagement with one another; and a hub support fabricated of a one-piece casting and including a support portion for supporting said hub; a mounting portion for mounting said hub support on a vehicle; a support for said actuator device; and a guide portion on which at least one of said friction material pads is mounted for said sliding displacement by said actuator device.

* * * * *